United States Patent [19]
Madsen

[11] 3,834,457
[45] Sept. 10, 1974

[54] LAMINATED HEAT PIPE AND METHOD OF MANUFACTURE

[75] Inventor: Per Madsen, Detroit, Mich.

[73] Assignee: The Bendix Corporation, Teterboro, N.J.

[22] Filed: Jan. 17, 1973

[21] Appl. No.: 324,463

Related U.S. Application Data

[63] Continuation of Ser. No. 107,464, Jan. 18, 1971, abandoned.

[52] U.S. Cl............................. 165/105, 29/157.3 R
[51] Int. Cl............................................. F28d 15/00
[58] Field of Search............................... 165/105

[56] References Cited
UNITED STATES PATENTS

| | | | |
|---|---|---|---|
| 3,229,759 | 1/1966 | Grover................................ | 165/105 |
| 3,498,369 | 3/1970 | Levedahl............................ | 165/105 |
| 3,554,183 | 1/1971 | Grover et al...................... | 165/105 X |
| 3,576,210 | 4/1971 | Trent.................................. | 165/105 |
| 3,613,778 | 10/1971 | Feldman Jr........................ | 165/105 |

*Primary Examiner*—Albert W. Davis, Jr.
*Attorney, Agent, or Firm*—Anthony F. Cuoco; S. H. Hartz

[57] ABSTRACT

A laminated heat pipe comprised of outer layers defining therebetween a heat pipe chamber, porous wick layers bonded to the inner surfaces of the outer layers, and an inner porous plenum layer located between and bonded to the wick layers. The porous wick layers are configured so that capillary flow of a contained working fluid will occur in the conventional manner, while the porous plenum layer is configured so that capillarity attraction thereto of the working fluid is lower than its attraction to the wick layers. Hence, the liquid phase working fluid is present substantially entirely in the wick layers, and the plenum layer provides both for a vapor flow path and structural support of the outer layers. The method of manufacture includes the step of first forming a laminate comprised of outer solid sheets, a pair of wick layers and an innermost sandwiched plenum layer all bonded together. The desired heat pipe configuration is then cut from the laminate, with the cut edge then sealed about its periphery save for a small opening through which the working fluid is introduced and which is subsequently sealed.

1 Claim, 2 Drawing Figures

PATENTED SEP 10 1974 3,834,457

INVENTOR
PER MADSEN
BY John R Benefiel
ATTORNEY

LAMINATED HEAT PIPE AND METHOD OF MANUFACTURE

This is a continuation of application Ser. No. 107,464, filed Jan. 18, 1971, now abandoned.

BACKGROUND OF THE INVENTION

1. Field of the Invention

This invention concerns heat pipes and a material for the manufacture thereof.

2. Brief Description of the Prior Art

Conventional heat pipes are constructed of an outer shell or housing, wick layers contiguous therewith, and an inner chamber defining a vapor flow path. The inner chamber is conventionally created by the configuration of the outer shell and/or the wick layers, which particularly for wide, flat configurations may require relatively heavy weight material for these elements since either compressive or expansionary fluid pressure forces may be quite large and which generally requires relatively extensive fabrication operations for the manufacture of each specific configuration.

Therefore, it is an object of the present invention to provide a laminate for heat pipe construction in which the vapor flow path chamber does not depend on either the wick layers or the outer shell for its structural integrity to thus be especially suited for flat or panel heat pipe configurations and which lends itself to simplified fabrication of a great variety of specific heat pipe shapes and designs without the need for extensive fabrication operations.

SUMMARY OF THE INVENTION

This object and others which will become apparent upon a reading of the following specification and claims is accomplished by providing a plenum layer intermediate the wick layers and integrally bonded thereto, the plenum layer having openings formed therein of relatively large dimensions, so that the capillarity attraction of the liquid phase working fluid thereto is much less than to the wick layers. This insures that the liquid phase working fluid will be retained solely in the wick layers and thus a vapor flow path through the plenum openings is provided. A method of manufacture is provided in which a laminate composed of a sandwich outer skin or shell layers, a pair of wick layers, and an inner plenum layer is first created by bonding the layers together, with the specific heat pipe configuration being cut from this laminate and then sealed for example by welding about its periphery. Working fluid is introduced prior to sealing the last portion thereof to complete the heat pipe.

DETAILED DESCRIPTION OF THE PREFERRED EMBODIMENT

In the following detailed description, certain specific terminology will be utilized for the sake of clarity and a specific embodiment described in order to provide a complete understanding of the invention, but the invention is not so limited and may be practiced in a variety of forms and embodiments.

Figure 1:
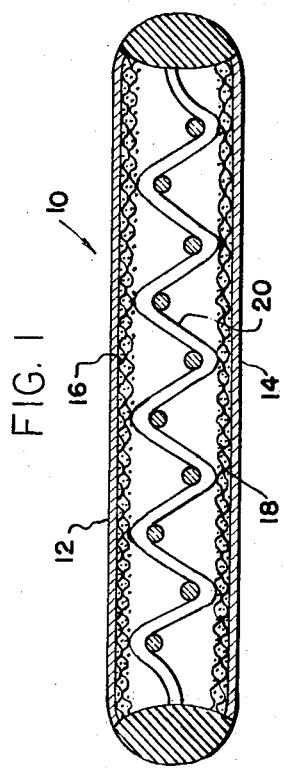
FIG. 1 is a front elevational view in partial section of a laminated heat pipe constructed according to the present invention.

Referring to the drawing and particularly FIG. 1, an integrally bonded heat pipe laminate comprising the heat pipe 10 according to the present invention is depicted. The heat pipe 10 includes outer shell layers 12 and 14 comprised of a pair of thin sheets of a solid material such as stainless steel surrounding the outer periphery thereof. In a working model of the invention, .024 inch thick stainless steel sheet was used.

Immediately under the outer shell layers 12 and 14 and bonded thereto is a pair of wick layers 16 and 18 formed of a pair of porous wick material having numerous small openings of such a dimension that relatively high capillary attractive forces will be exerted on the working fluid and capillary flow of the working fluid will occur therethrough. Inasmuch as the design of this material in itself is well known in the art, it is not felt necessary to describe the same in any great detail. Suffice it to say that many materials may be used to create the capillary flow necessary for circulating the working medium therethrough for proper functioning of the heat pipe, depending on the working fluid used and on the conditions of use. Such capillary forces depend on the contact angle between the working fluid and the wick materials, the dimensions of the wick layer openings, etc., as is well known in the art. For the working model referred to above, the wick layer material was created by stacking 200 × 200 stainless steel mesh and with water as the working fluid, satisfactory performance was realized.

Intermediate the wick layers 16 and 18, is the plenum layer 20 which constitutes the improvement of the present invention. This layer 20 occupies the space intermediate the wick layers 16 and 18 and creates the space necessary for a vapor flow path necessary for heat pipe functioning. For this purpose, this layer 20 is formed of a material having openings therein sufficiently large so that the liquid phase working fluid exhibits a preferential attraction for the wick layers 16, 18, i.e., the capillarity attraction forces between the plenum layer 20 and the working fluid is much lower than with the wick layers. Thus, the liquid phase working fluid will be present substantially entirely in the wick layers 16 and 18, and the unoccupied plenum layer 20 openings define a vapor flow path for the vapor phase of the fluid medium during the evaporation-condensation cycle of the heat pipe 10. This allows the conventional cycling of the heat pipe to occur, creating a relatively large heat transfer between regions of the heat pipe experiencing temperature differentials in the manner well known in the art. Since such capillarity attraction forces are a function of the working fluid properties, the contact angle of the working fluid with the plenum layer 20 material, the plenum layer opening size and geometry and other factors, many materials and opening configurations could be utilized for this layer depending on the working fluid used and the particular heat transfer application. Typical examples are sheet metal stampings having appropriately dimensioned channels formed therein, sheets of expanded metal, or coarse wire mesh. In the aforementioned working model, a coarse stainless steel wire mesh of 16 × 16 dimension was successfully utilized.

It can be appreciated that since the plenum layer 20 is bonded to the wick layers 16 and 18 which are in turn bonded to the outer shell layers 12 and 14, structural support against both expansionary and compressive forces created by the differential between atmospheric pressure and the internal vapor pressure is provided, thus allowing much lighter housing materials to be used, extending the operating temperature range of the heat pipe, and rendering wide, flat heat pipe panel configurations feasible.

A sufficient quantity of a working fluid such as water is introduced so that the wick layers 16 and 18 are filled, with perhaps a very small quantity being present in the plenum layer 20.

The heat pipe is sealed about its periphery 22 as by welding, etc., to define a closed fluid tight chamber.

In operation, if one end of the laminated heat pipe 10 is heated, a portion of the liquid phase working fluid present in the wick layers 16 and 18 at the heated end is vaporized, passing into the plenum layer 20 adjacent the wick layers 16 and 18, the vapor expanding into other portions of the heat pipe via the large openings therein. The liquid phase fluid tends to flow into the pores emptied by the vaporized fluid, while the vapor phase fluid tends to be condensed in the cooler regions of the heat pipe, thus setting up a circulation of working fluid which tends to create a large transfer of heat at relatively low temperature differentials in the manner now well known in the art.

Figure 2:
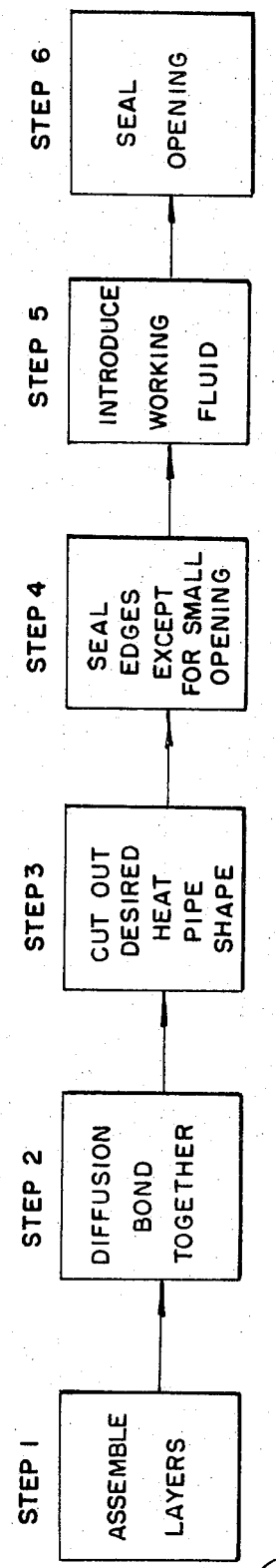
FIG. 2 is a block diagram representation of the steps of fabricating the laminated heat pipe according to the teaching of the present invention.

Referring to FIG. 2, a method of manufacturing a heat pipe according to the present invention is depicted in block diagram form. In the first step, a laminate is created by stacking layers of the outer skin material, the wick layers and the plenum layer and bonding them together as by diffusion bonding or other appropriate joining techniques.

This laminate may be very simply used to fabricate heat pipes of a great variety of shapes and sizes by, in Step II, cutting from the laminate the desired heat pipe configuration, then in Step III, sealing the cut laminate abouts its periphery as by crimping or welding, leaving, however, a small opening.

In Step IV, the working fluid is introduced through the opening and then in Step V, the opening is sealed to create the heat pipe according to the present invention.

As can be appreciated, a great variety of heat pipe sizes and shapes can thus be fabricated from this laminate without the need for extensive fabrication operation.

While a specific example of the present invention has been described, many modifications and substitutions are of course possible within the scope of the appended claims.

For example, other porous material than the wire mesh described could be used or other working fluids than water, as will be apparent to those skilled in the art.

What is claimed is:

1. A heat pipe comprising:
   a laminate formed of a pair of outer solid sheets, at least one porous wick sheet comprised of a layer of mesh between said outer solid sheets and an innermost porous plenum sheet comprised of a layer of mesh also disposed between said outer solid sheets, all of said sheets sandwiched together to form said laminate, said openings in said porous plenum sheet being coarser than the openings in said wick sheet;
   means sealing said laminate about the periphery thereof; and
   a quantity of working liquid disposed within said laminate, whereby the coarser sizing of said openings of said porous plenum sheet tend to create preferential capillary attraction to said porous wick sheet of said working liquid to tend to create a vapor flow path through said porou plenum sheet openings.

* * * * *